United States Patent
Cepulis et al.

(10) Patent No.: US 8,392,901 B2
(45) Date of Patent: Mar. 5, 2013

(54) REPLACING A ROM IMAGE IN A COMPUTER'S ROM

(75) Inventors: Darren J. Cepulis, Houston, TX (US); Andrew Brown, Houston, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 2352 days.

(21) Appl. No.: 11/262,200

(22) Filed: Oct. 28, 2005

(65) Prior Publication Data
US 2007/0169077 A1    Jul. 19, 2007

(51) Int. Cl.
*G06F 9/44*      (2006.01)
*G06F 12/00*    (2006.01)

(52) U.S. Cl. .......... 717/168; 711/102

(58) Field of Classification Search .......... 717/168–175; 710/36; 714/36, 49; 713/100; 709/221
See application file for complete search history.

(56) References Cited

U.S. PATENT DOCUMENTS

| | | | | |
|---|---|---|---|---|
| 5,729,675 A | * | 3/1998 | Miller et al. | 714/36 |
| 5,819,087 A | * | 10/1998 | Le et al. | 713/2 |
| 5,987,536 A | * | 11/1999 | Johnson et al. | 710/36 |
| 6,052,803 A | * | 4/2000 | Bhatia et al. | 714/49 |
| 2004/0078503 A1 | | 4/2004 | Zaudtke et al. | |
| 2004/0162893 A1 | | 8/2004 | Brown et al. | |

FOREIGN PATENT DOCUMENTS

EP    1028371 A2 *  8/2000

OTHER PUBLICATIONS

"Online ROM Flash Component for Linux—HP Integrated Lights-Out," Version 1.70, Feb. 23, 2005, 2 pp. [Online] http://h18004.www1.hp.com/support/files/server/us/download/22472.html.
"Online ROM Flash for System Upgrade," User Guide, Second Edition, May 2001, Compaq Computer Corporation, 50 pp.

* cited by examiner

Primary Examiner — H. S. Sough
Assistant Examiner — Carina Yun

(57) ABSTRACT

In at least some embodiments, a method comprises receiving a first command from a source external to a computer to provide a copy of a read only memory (ROM) image from the computer to the external source. The method also comprises receiving a second command from the source external to the computer to replace the computer's ROM image and, without re-booting the computer, replacing the computer's ROM image with a ROM image received from the external source.

19 Claims, 2 Drawing Sheets

REPLACING A ROM IMAGE IN A COMPUTER'S ROM

BACKGROUND

Most, if not all, computers include read only memory (ROM) on which boot code is stored. Such a ROM may be referred to as a "system ROM." Such code is executed by the computer's processor to perform various tasks during the boot process such as determining the hardware components installed in the computer, testing memory, etc. Such ROMs are typically implemented in the form of electrically erasable ROMs (EEPROMs) to permit the boot code to be replaced when desired. The replacement process is usually referred to as "flashing" the ROM. Issues such as the size/capacity of the EEPROM and how the EEPROM is to be flashed are considered when designing a system employing such EEPROMs.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections. The term "system" refers broadly to a collection of two or more components and may be used to refer to an overall system (e.g., a computer system or a network of computers) as well as a subsystem provided as part of a larger system (e.g., a subsystem within an individual computer). As used herein, the term "read only memory" (ROM) includes write-once ROMs (burned once and non-reprogrammable) as well as reprogrammable devices such as electrically erasable read only memory devices (EEPROMs).

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
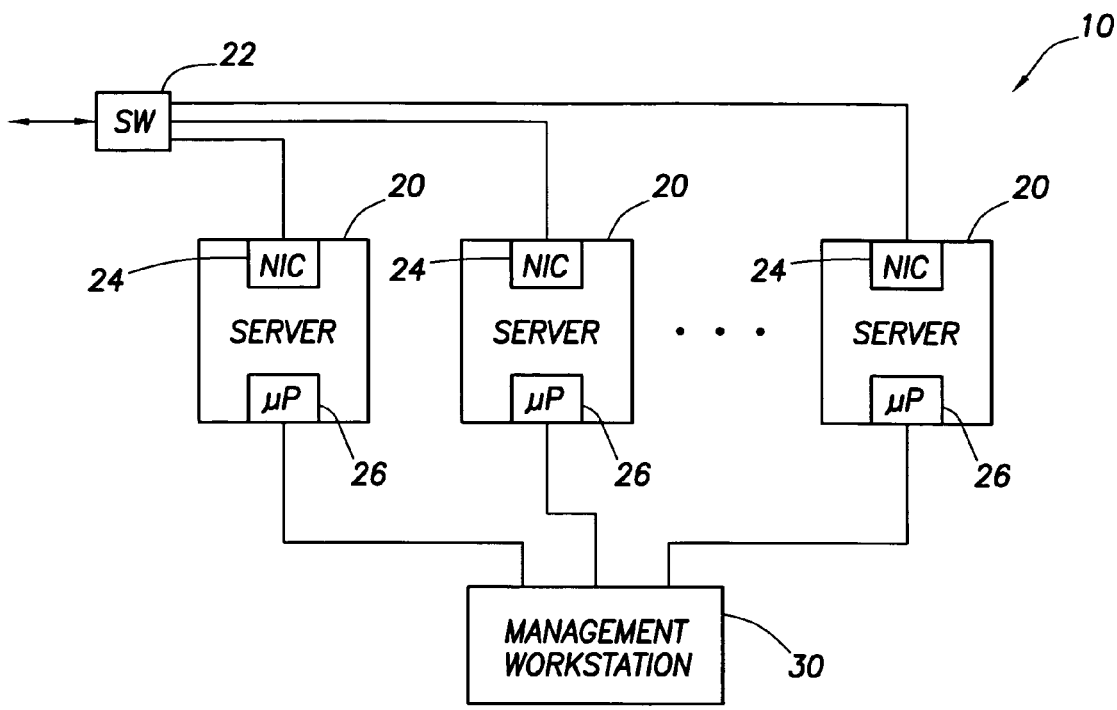
FIG. 1 shows a system diagram showing various computers coupled to a management workstation in accordance with embodiments of the invention.

FIG. 1 shows a system 10 comprising one or more computers 20, a switch 22, and a management workstation 30. Each computer 20 functions as a server and includes at least one network interface controller (NIC) 24 to thereby permit the server to be coupled to the switch 22. The switch 22 permits the servers to communicate with an external network and/or logic. The servers 20 generally perform one or more functions. For example, the servers 20 may be intended to process data transactions such as bank transactions, web page requests, etc. Such transaction requests are passed to the servers 20 via switch 22 and data produced by the servers are provided back to the source of the request via the switch 22. This disclosure imposes no restriction on the principle functionality of each server.

Each server 20 also comprises a management processor (MP) 26 through which the server communicates with the management workstation 30. The management workstation 30, which itself may comprise a computer, provides a point of control for management purposes for the servers. For example, the management workstation can be used by a person to manually, or via a script, load an operating system into a server, enable and disable various server features, and the like. The data connectivity between the servers 20 and management workstation 30 forms a local area network (LAN) that, in accordance with embodiments of the invention, is used primarily or exclusively for system management purposes, that is, not to process data in accordance with the principle functionality of the servers. Thus, the LAN formed between the servers 20 and the management workstation 30 is generally not used to process data transactions that are received via switch 22. At least one of the functions performed by the management workstation 30, as explained below, is to assist in flashing a ROM in a desired server.

Figure 2:
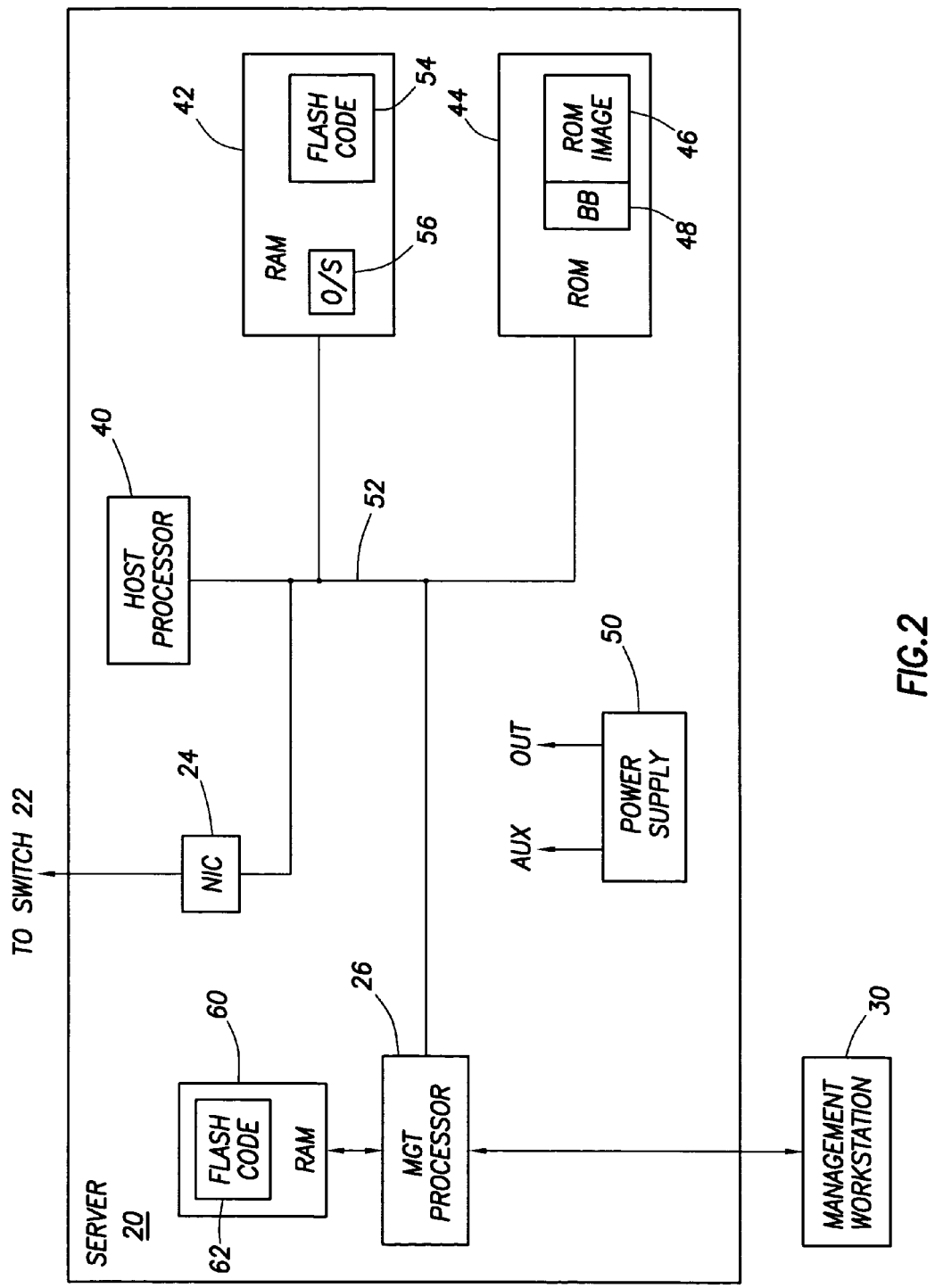
FIG. 2 shows a block diagram of a server in accordance with embodiments of the invention.

FIG. 2 shows an embodiment of an individual server 20. In addition to NIC 24 and management processor 26, each server comprises a host processor 40, random access memory (RAM) 42 and 60, a ROM 44 and a power supply 50. The various components are coupled as shown via one or more busses 52. An operating system 56 is provided on the server and executed by the host processor 40. The server architecture depicted in FIG. 2 can be varied as desired and need not be the same among all servers 20.

The ROM 44 in FIG. 2 contains a ROM image 46 that comprises code that is executable by the host processor 40. Such code is used to boot the server and thereby perform various tasks as determine the components installed in the server, test the RAM 42, etc. Such code may also contain various low-level routines that enable operation and use of peripheral devices such as storage drives, NICs, etc. In accordance with embodiments of the invention, the ROM 44 comprises a re-programmable ROM device such as an electrically erasable ROM (EEPROM). Accordingly, the ROM 44 can be "flashed" which generally entails clearing the contents of the ROM (e.g., setting each addressable value to FFh) and writing new information to the ROM. Flash code 54 from system RAM 42 can be executed by the host processor 40 to flash the ROM 44. The management processor 26 can also flash the ROM by execution of its own flash code 62 stored in RAM 60 which is generally dedicated for use by the management processor. Although the processor's flash code 62 is shown stored in RAM 60, the code could also be stored in a ROM, which may be separate from ROM 44 or may be ROM 44. The ROM 44 thus can be flashed so as to load a new ROM image 46. A boot block (BB) 48 contains information about the ROM and how to flash the device. The BB 48 may be part of, or separate from, the reprogrammable ROM image 46.

The power supply 50 receives alternating current (AC) input power and provides at least two direct current (DC) output voltage taps. The output labeled "OUT" includes one or more DC voltage levels and is turned on and off as the server 20 is powered on or off. Thus, all components within the server that are powered by the OUT power supply output turn on and off as the server is turned on and off. The auxiliary output (labeled "AUX"), however, is on even when the server is otherwise off. That is, when the server is powered off, those components that receive power from the OUT power supply output are off, while those components that receive power from the AUX power supply output are on. In accordance with embodiments of the invention, at least the management processor 26, the ROM 44 and any other component used to flash the ROM 44 by the management processor 26 are connected to the AUX power supply output. This power supply configuration permits the management processor 26 to flash the ROM 44 even while the host processor 40 is in a non-operational state. In this context, a non-operational state includes a power off state, as well as any of a variety of low power states that precludes the host processor from executing code.

Figure 3:
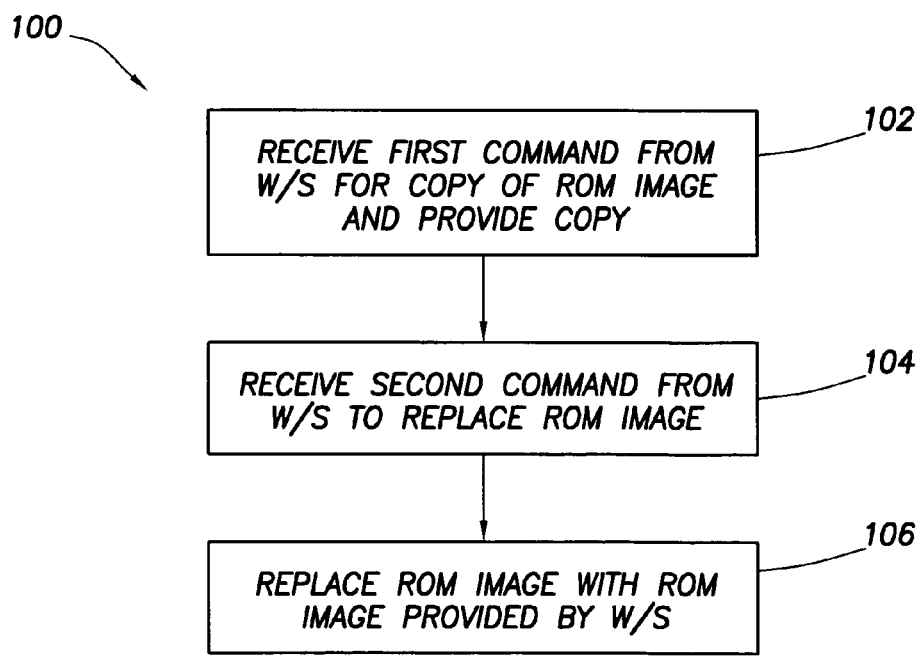
FIG. 3 provides a method implemented on a server in accordance with embodiments of the invention.

Referring now to FIGS. 2 and 3, a method 100 is shown (FIG. 3) by which the management processor 26 interacts with the management workstation 30 to flash the server's ROM 44. At 102, method 100 comprises the management processor 26 receiving a first command from the workstation 30. This first command comprises a request by the workstation for a copy of the ROM image 46 that is currently loaded into the server's ROM 44. In response, the management processor 26 provides a copy of the ROM image to the workstation. The workstation 30 stores a copy of the image and can use the stored copy as a back-up copy in the event the ROM flashing operation fails to successfully complete. The workstation stores the ROM image copy in a database that associates that copy with the particular server from which it came.

At 104, the management processor 26 receives a second command from the workstation 30 to replace the ROM image 46 in the ROM 44. This command includes the ROM image data that is to be loaded into the ROM 44. In response to receiving this command, the management processor 26 (at 106) executes the flash code 62 to flash the ROM 44 with the new ROM image provided to the management processor by the workstation.

In executing the flash code 62, the management processor 26 retrieves a flash abstraction table from the boot block 48. The flash abstraction table provides high level information about how to flash that particular ROM, such as addresses, pointers, how to lock and unlock the ROM, etc.

In some embodiments, the first and second commands are separate commands, as indicated above. In other embodiments, one command is sent by the management workstation 30 to the management processor 26 to cause both actions to occur—provide a copy of the current ROM image back to the management workstation as well as provide a new ROM image to the management processor for loading into the ROM. In still other embodiments, the management processor does not provide a copy of the current ROM image to the workstation.

In accordance with some embodiments, both the host processor 40 and the management processor 26 are able to execute the flash code 54 and 62, respectively, to flash the ROM 44. The flash code 62 that is executed by the management processor 26 to flash the ROM 44 may be a copy of the same flash code (code 54) that is used by the host processor 40 to flash the ROM. The management processor's flash code 62 may be pre-loaded onto the server or may be downloaded via the management processor 26 to the server 20. In this latter embodiment, the workstation 30 not only provides the new ROM image to be flashed, but also can provide the executable code that enables the flashing operation.

The boot block 48 contains a value that indicates the version of the ROM image. If desired, the management workstation can transmit a third command to the management processor 26 to request the management processor to determine and report back the version of the ROM image currently flashed in the ROM. The management workstation 30 may use the version value to determine whether the server 30 needs to have its ROM re-flashed. If the server's ROM image version matches the version of a ROM image that the workstation desires to flash into the ROM, the workstation may determine that re-flashing the server's ROM is unnecessary and avoid the flash operation. The ability to check the ROM image's version may be useful in, for example, those embodiments in which the host processor 40 can also flash the ROM. As such, it is possible that the management workstation will not be aware of the identity of current ROM image in the ROM as the host processor 40, without involvement of the management workstation, may have previously flashed the ROM.

Referring to FIG. 1, the management workstation 30 can flash a ROM in each of a plurality of servers. This process can be performed manually by a user interacting with the management workstation. Alternatively, a user can create a script which is subsequently run to re-flash each server's ROM in an automated fashion. Flashing the ROMs among a plurality of servers can be performed by completely flashing a server's ROM in sequence (i.e., one ROM flash at a time). Alternatively, the management workstation can transmit the first command explained above (which requests a copy of the currently loaded image) from each of a plurality of server management processors, then transmit the second command (to request that a new image be flashed into each of servers' ROMs. In this latter approach, the ROMs of a plurality of servers are flashed effectively in parallel.

The ROM flashing process described above occurs without use of the host processor 40, and as noted above, the host processor may be in a non-operational state. Further still, the management processor 26 can flash ROM 44 while the host processor is actively working (e.g., executing an operating system, applications, etc.) and without interrupting the host processor or its normal operations. In some embodiments, the server 20 may comprise multiple host processors and the management processor can flash the ROM while all such host processors are in a non-operational state or while one or more of such host processors are actively working and without interrupting such actively working processor(s). The use of the management processor 26 to flash the ROM also occurs without involvement of the server's operating system 56. Any of a variety of different types of ROMs may be used and differences exist with respect to have how each particular ROM is to be flashed. The embodiments described herein avoid the server operating systems from requiring special drivers or other capabilities to flash the particular ROM of the associated server. Further still, because the management workstation 30 can store a back-up copy of the ROM image, the ROM 44 in the server need not itself have the capacity to store a back-up ROM image. Accordingly, the ROM 44 may be smaller (in terms of capacity and thus size) and correspondingly cheaper than if the ROM required extra capacity to store a back-up copy of the ROM image. In addition, the management processor 26 can flash the ROM without having to re-boot the server, although re-booting the server may be necessary to cause the newly flashed code to be used.

While the embodiments described herein are provided in the context of servers coupled to a workstation, in other embodiments, a computer 20 could be other than a server. Further still, there is no requirement that a plurality of computers 20 be coupled to a single management workstation 30. In general, a source of a ROM image external to a computer is used to assist in flashing a ROM in the computer. That external source is not necessarily a management workstation and the computer is not necessarily a server. The teachings herein can be used to flash a ROM internal to an individual's home personal computer.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method, comprising:
receiving a first command from a source external to a computer to provide a copy of a read only memory (ROM) image from said computer to said external source;
transmitting said ROM image by said computer to said external source; and
receiving a second command from the source external to said computer to replace the computer's ROM image;
without re-booting said computer, replacing the computer's ROM image with a ROM image received from the external source.

2. The method of claim 1 further comprising storing said ROM image copy in storage associated with said external source.

3. The method of claim 2 further comprising associating said externally stored ROM image copy with said computer.

4. The method of claim 1 further comprising receiving a third command from said external source to determine a version value of the computer's ROM image before replacement with the ROM image received from the external source.

5. The method of claim 4 further comprising determining whether to have the computer's ROM image replaced based on the version value received from the computer.

6. The method of claim 1 further comprising providing executable ROM update code from said external source to said computer, said executable ROM update code being used by said computer to replace said ROM image.

7. The method of claim 1 wherein said computer comprises a plurality of processors and a first of said processors replaces said ROM image while all other processors are in a non-operational state.

8. The method of claim 7 wherein non-operational state comprises a powered off state.

9. The method of claim 1 wherein said computer comprises a plurality of processors and one of said processors replaces said ROM image while at least one other processor is actively working and without interrupting said other processor.

10. A method implemented in a computer, comprising:
a management processor in said computer receiving a first command from a source external to said computer to provide a copy of a read only memory (ROM) image from said computer to said external source;
the management processor receiving a second command from the external source to update the computer's ROM image;
without having to re-boot said computer, the management processor updating the computer's ROM image with an image received from said external source;
wherein said management processor receives the first and second commands and updates the computer's ROM image even while a host processor in the computer is in a non-operational state.

11. The method of claim 10 wherein said non-functional state comprises a powered off state.

12. The method of claim 10 wherein said management processor updates the computer's ROM image even while a host processor in the computer is actively working and without interrupting said host processor.

13. A computer, comprising:
a management processor; and
a read only memory (ROM) coupled to said management processor;
wherein, upon request from a device external to said computer, said management processor provides a copy of an executable ROM image currently stored in said ROM to the external device and receives a replacement executable ROM image from the external device.

14. The computer of claim 13 further comprising a host processor coupled to said ROM and wherein the management processor provides said executable ROM image copy and receives said replacement executable ROM image while said host processor is in a non-operational state.

15. The computer of claim 14 wherein the non-operational state comprises a powered off state.

16. The computer of claim 13 wherein said management processor replaces the executable ROM image currently stored in said ROM with the replacement executable ROM image received from the external device.

17. The computer of claim 13 further comprising an operating system and wherein said management processor replaces the executable ROM image currently stored in said ROM with the replacement executable ROM image received from the external device without involvement of said operating system.

18. The computer of claim 13 wherein said management processor replaces the executable ROM image currently stored in said ROM with the replacement executable ROM image received from the external device without rebooting the computer.

19. The computer of claim 13 further comprising a host processor coupled to said ROM and wherein the management processor flashes the ROM with the replacement executable ROM image without interrupting the host processor and while the host processor is actively working.

* * * * *

UNITED STATES PATENT AND TRADEMARK OFFICE
CERTIFICATE OF CORRECTION

PATENT NO. : 8,392,901 B2  
APPLICATION NO. : 11/262200  
DATED : March 5, 2013  
INVENTOR(S) : Darren J. Cepulis et al.

Page 1 of 1

It is certified that error appears in the above-identified patent and that said Letters Patent is hereby corrected as shown below:

In the Claims:

In column 5, line 23, in Claim 1, delete "source external" and insert -- external source --, therefor.

In column 5, line 29, in Claim 1, delete "source external" and insert -- external source --, therefor.

In column 6, line 3, in Claim 10, delete "source external" and insert -- external source --, therefor.

Signed and Sealed this  
Sixth Day of August, 2013

Teresa Stanek Rea  
*Acting Director of the United States Patent and Trademark Office*